June 4, 1940.  C. M. SLOMAN ET AL  2,203,342
SPRING DEVICE
Original Filed Sept. 30, 1937
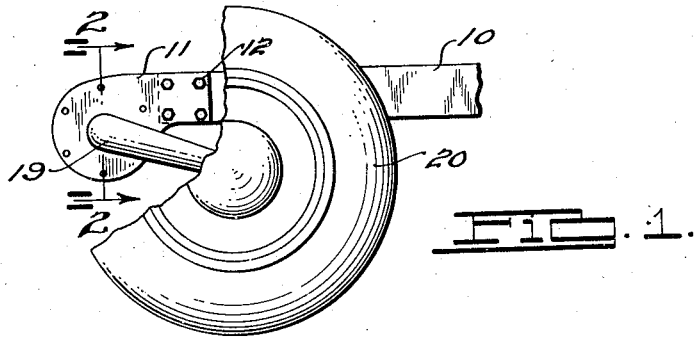
FIG. 1.
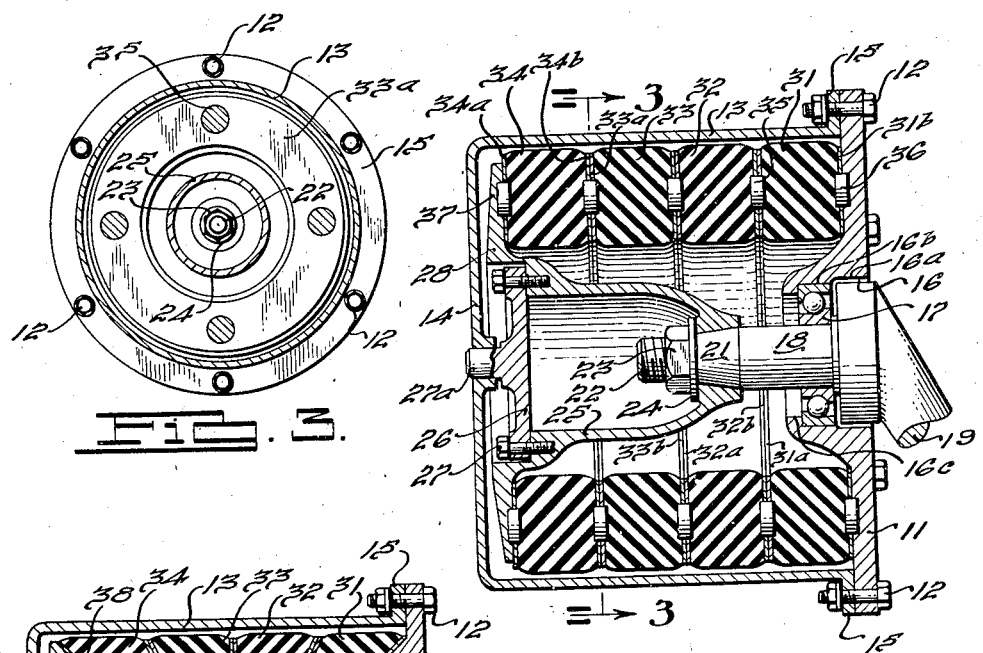
FIG. 3.
FIG. 2.
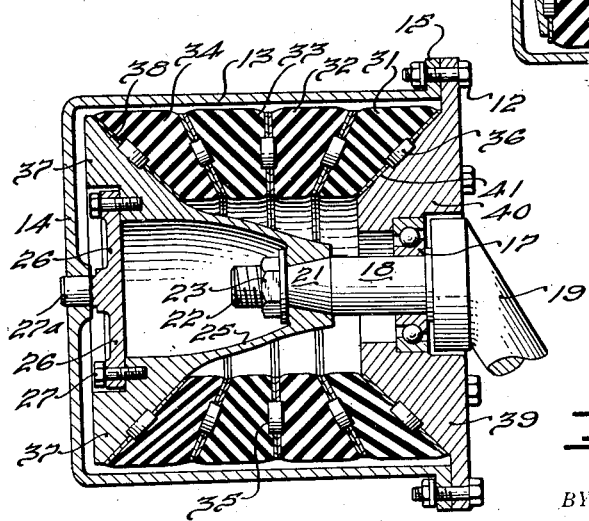
FIG. 4.
INVENTORS.
Cheri M. Sloman,
Hans Hierta.
BY Dike, Calver & Gray
ATTORNEYS.

Patented June 4, 1940

2,203,342

UNITED STATES PATENT OFFICE 2,203,342

SPRING DEVICE

Cheri M. Sloman and Hans Hierta, Detroit, Mich., assignors to Briggs Manufacturing Company, Detroit, Mich., a corporation of Michigan Application September 30, 1937, Serial No. 166,500
Renewed April 22, 1940

15 Claims. (Cl. 267—21)

This invention relates to wheel suspension devices for vehicles, such as motor vehicles and the like, an object of the present invention being to provide an improved wheel suspension device for a vehicle in which the resiliency of wheel suspension is effected by the provision of torsion members made of resilient material such as rubber, which members are adapted to resist the vertical movements of the wheels.

Another object of the invention is to provide novel and improved means for resiliently mounting the front or rear wheels of a motor vehicle, which means are adapted to spring each wheel separately, are very compact, and permit substantial lowering of the vehicle between the front wheels.

Still another object of the invention is to provide an improved wheel suspension device for a motor vehicle having a structure to be sprung, in which there is no load supporting metal to metal path from the wheels to the sprung structure of the vehicle.

A further object of the invention is to provide an improved wheel suspension device including rubber members, means being provided to put said rubber members under a predetermined degree of lateral compression.

It is an added object of the present invention to provide an improved wheel suspension of the foregoing character which is simple in construction and is relatively cheap to manufacture and repair.

Other objects of this invention will appear in the following description and appended claims, reference being had to the accompanying drawing forming a part of this specification wherein like reference characters designate corresponding parts in the several views.

Fig. 1 is a fragmentary side view of a motor vehicle, showing a wheel operatively suspended by means of my novel wheel suspension device.

Fig. 2 is a transverse vertical sectional view taken on line 2—2 of Fig. 1 looking in the direction of the arrows.

Fig. 3 is a transverse vertical sectional view taken on line 3—3 of Fig. 2 looking in the direction of the arrows.

Fig. 4 is a view illustrating a modified construction of the wheel suspension device embodying the present invention, said device being shown in vertical section.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawing there is shown by way of example a part of a motor vehicle provided with front wheel suspension embodying the present invention. Referring to Fig. 1, the illustrated structure includes a frame 10 to which there is bolted or otherwise secured a plate 11. To the plate 11 is secured by means of bolts 12 a hollow drum 13 having a closed end 14 and an open end provided with flanges 15 engaged by the bolts 12. In the center of the plate 11 there is provided a three step aperture generally indicated by the numeral 16, the steps of which are indicated by the characters 16a, 16b and 16c, respectively.

In the counterbore or step 16b there is provided a ball bearing 17 in which there is journalled the spindle 18 of the arm 19 carrying a road wheel 20. The spindle 18 is arranged coaxially with the drum 13 and extends inwardly thereof. The end of the spindle is made tapering as indicated at 21, a threaded portion 22 being provided for the purpose of securing to said spindle with the said of a nut 23, a washer 24 and a hollow hub 25, which hub is provided with a closed end having a tapering hole engaging the portion 21 of the spindle, secure engagement being effected by the nut and washer, as mentioned. The opposite end of the hub 25 is open and is provided with a centering disk 26 detachably secured to the hub in any suitable manner, such as by means of screws 27. In the center of said disk 26 there is provided a tail extension 27a journalled in a hole provided in the center of the closed end 14 of the drum. By virtue of the above construction vertical movements of the wheel 20, causing swinging movement of the arm 19, cause rotation of the spindle 18 and the hub 25, both rotating as a single unit supported by two bearings.

The hub 25 is provided with flanges 28, which flanges in the embodiment illustrated in Fig. 2 extend in a plane substantially perpendicular to the axis of the drum. Between the surfaces of said flanges 28 and the plate 11 there is operatively arranged a plurality of rubber members indicated by the numerals 31, 32, 33 and 34. In the embodiment illustrated in Fig. 2, said members are of a substantially rectangular cross section. To the side surfaces of said rubber members are bonded or equivalently secured two flat washers or disks indicated respectively by the numerals 31a, 31b, 32a, 32b, 33a, 33b, 34a and 34b. The washers of the adjacent members, such for instance as the washers 34b and 33a are positively connected together for rotation by means of metal inserts or coupling members 35 fitting within apertures in the adjacent disks. The washer 31b of the first member is anchored at the plate 11 by means of a metal insert 36, while the washer 34a of the last member 34 is positively connected for rotation to the flange 28 of the hub 25 by means of a metal insert 37. In the process of assembly the resilient members are compressed by tightening the nut 23, causing a slight bulging out of the rubber members at their cylindrical surfaces as is clearly shown in the drawing.

With the above description in view it can be clearly seen from an examination of the drawing that vertical movements of the wheel 20 cause swinging movements of the arm 19 and rotation of the spindle 18 and the hub 25. Because of the connection of the flanges 28 of said hub 25 to the rubber 34, the rotation of the hub causes corresponding rotation of the member 34 which is transmitted to the adjacent members 33, 32 and 31. However, because of the anchoring of the member 31 at the plate 11, which prevents rotation of the member 31, the rubber members are distorted torsionally, offering a certain amount of torsional resistance to the rotative effort of the hub 25 and spindle 18, and consequently, to the vertical movements of the wheel 20, thus effecting the resilient suspension of said wheel.

In the modification illustrated in Fig. 4 the rubber members are so shaped that their sides converge, when inwardly projected, substantially at the center of the drum 13, the sheet metal washers or disks being pressed to a shape to correspond to the above specified form of the rubber members. The hub 37 corresponding to the hub 25 of the structure illustrated in Fig. 2 is shaped to provide the tapering surface 38 also converging in its inward projection at the center of the drum. The plate 39 corresponding to the plate 11 of the structure of Fig. 2 is provided with a tapering extension 40 forming a tapering surface 41 converging in its projection at the center of the drum. By virtue of the above described construction the cross sections of the rubber members is made gradually diminishing toward the axis of the drum and, therefore, a substantially uniform distortion of said members throughout their entire cross section is effected in operation. It should be noted that the above specified operation and cross section of the rubber members is effected without undesirable elongation of the drum, which elongation has proved to be particularly objectionable. With respect to other features of operation the structure illustrated in Fig. 4 is substantially similar to the structure of Fig. 2.

It will be understood that the spring device, comprising the plurality of interconnected annular rubber members, is at all times subjected to and held under compression in a direction axially of the members. Also, said rubber members are at all times subjected to torsional stresses. These members are pre-loaded so as to sustain the static load of the vehicle and as a consequence the torsion of these members supports the vehicle when at rest.

We claim:

1. In a wheel suspension device for a vehicle having a frame, a drum secured to the frame, a swinging wheel carrying arm having a spindle extending into said drum and journalled therein, a spring device comprising a plurality of annular rubber members housed within the drum, one end of said device being fixed with relation to the drum and the other end being connected to the spindle, said rubber members having bonded metallic surfaces, the surfaces of adjacent members being juxtaposed, and coupling means connecting said juxtaposed surfaces together.

2. In a wheel suspension device for a vehicle having a frame, a drum secured to the frame, a swinging wheel carrying arm having a spindle extending into said drum and journalled therein, a spring device comprising a plurality of annular rubber members housed within the drum and connected together at their adjacent faces, one end of said device being fixed with relation to the drum and the other end connected to the spindle, said rubber members having converging sides and the corresponding sides of adjacent members being non-parallel.

3. In a wheel suspension device for a motor vehicle having a sprung structure, a plate secured to said sprung structure, a hollow drum having a closed end and an open end, the latter being secured to said plate, a wheel carrying arm, a spindle on said arm journalled in said plate coaxially with said drum and extending inwardly thereof, a hub arranged within said drum, means on one end of said hub connecting the same to the spindle, means on the other end of the hub centering the same in the closed end of the drum, and a plurality of annular resilient members connected together in series, the first of said members being anchored to said plate and the last of said members being secured to said hub, whereby rotation of said spindle because of the swinging movement of the arm causes torsional distortion of said resilient members.

4. In a wheel suspension device for a motor vehicle having a sprung structure, a plate secured to said sprung structure, a hollow drum having a closed end and an open end and secured to said plate by said open end, a wheel carrying arm, a spindle on said arm journalled in said plate coaxially with said drum and extending inwardly thereof, a hub arranged within said drum, means on one end of said hub connecting the same to the spindle, means on the other end of the hub centering the same in the closed end of the drum, and a plurality of annular resilient members of a substantially rectangular cross section arranged one beside the other, two flat metal washers bonded to the sides of each of said resilient members, the end washer of the first member being secured to said hub and the washers of adjacent members being positively connected together, whereby rotation of said spindle because of the vertical movements of the wheel causes torsional distortion of said resilient members.

5. In a wheel suspension device for a motor vehicle having a sprung structure, a plate secured to said sprung structure, a hollow drum having a closed end and an open end and secured to said plate by said open end, a wheel carrying arm, a spindle on said arm journalled in said plate coaxially with said drum and extending inwardly thereof, a hub arranged within said drum, means on one end of said hub connecting the same to the spindle, means on the other end of the hub centering the same in the closed end of the drum, and a plurality of annular resilient members of a substantially rectangular cross section arranged one beside the other, two flat metal washers bonded to the sides of each of said resilient members, the end washer of the first member being secured to said hub and the washers of adjacent members being positively connected together, whereby rotation of said spindle because of the vertical movements of the wheel causes torsional distortion of said resilient members, the means for connecting said hub to said spindle being adapted to put said resilient members in compression in the direction of the axis of said spindle.

6. In a wheel suspension device for a motor vehicle having a sprung structure, a plate secured to said sprung structure, a hollow drum having a closed end and an open end by which it is secured to said plate; a wheel carrying arm having a wheel mounted on one of its ends and a spindle on its other end, said spindle being journalled in said plate and extending inwardly thereof; a flanged hub arranged within said drum; a threaded portion on the end of said spindle and a nut cooperating therewith for connecting said hub to said spindle; a centering disk secured to the opposite end of the hub and having an extension journalled in the closed end of said drum; a plurality of annular rubber members connected together in series, the first of said members being anchored to said plate and the last of said members being secured to said hub, whereby rotation of said spindle because of the swinging movement of the arm causes torsional distortion of said resilient members.

7. In a wheel suspension device for a motor vehicle having a sprung structure, a hollow drum, a wheel carrying arm having a wheel mounted on one of its ends and a spindle on its other end, said spindle being journalled at one end of said drum and extending inwardly thereof; a flanged hub arranged within said drum; a threaded portion on the end of said spindle and a nut cooperating therewith for connecting said hub to said spindle; a centering member secured to the opposite end of the hub and journalled in one end of said drum; a sprung device comprising a plurality of annular rubber members arranged one beside the other, two metal disks bonded to the sides of each of said resilient members, one end disk of said device being secured to one end of the drum and the opposite end disk being secured to said hub, the disks of the adjacent members being positively connected together, whereby rotation of said spindle because of the vertical movements of the wheel causes torsional distortion of said resilient members.

8. In a wheel suspension device for a vehicle having a sprung structure, a plate secured to said sprung structure, a hollow drum having one end secured to said plate, a wheel carrying swinging arm, a spindle on said arm journalled in said plate coaxially with said drum and extending inwardly thereof, a hollow flanged hub arranged within said drum and secured to said spindle, the flanges of said hub tapering toward the center of the drum, means provided on the flanged end of the hub for journalling the same in the opposite end of the drum, a plurality of annular rubber members arranged one beside the other and connected together in series, the sides of said rubber members converging toward the center of the drum, means on said plate providing a surface converging toward the center of the drum, the first of said rubber members being secured to said surface, while the last of said rubber members is secured to the tapering surface of the hub flange, whereby swinging movements of said arm cause torsional distortion of said rubber members with substantially uniform deflection of said members throughout the entire cross section thereof.

9. In a wheel suspension device for a vehicle having a sprung structure, a plate secured to said sprung structure, a hollow drum having one end secured to said plate, a wheel carrying swinging arm, a spindle on said arm journalled in said plate coaxially with said drum and extending inwardly thereof, a hollow flanged hub arranged within said drum and secured to said spindle, the flanges of said hub tapering toward the center of the drum, means provided on the flanged end of the hub for journalling the same in the center of the opposite end of the drum, a sprung device comprising a plurality of annular rubber members arranged one beside the other, the sides of said rubber members converging toward the center of the drum, means on said plate providing a surface converging toward the center of the drum; two annular sheet metal disks bonded to the sides of each of said rubber members, the disk at one end of said device being secured for rotation to the tapering surface of said last named means and the disk at the other end of said device being secured for rotation to the tapering surface of said hub flange, the washers of the adjacent rubber members being positively secured to each other; whereby swinging movements of said arm cause torsional distortion of said rubber members with substantially uniform deflection of said members throughout the entire cross section thereof.

10. In a wheel suspension device for a vehicle having a frame, a drum secured to the frame, a swinging wheel carrying arm having a spindle extending into said drum and journalled therein, a spring device comprising a plurality of annular rubber members housed within the drum, one end of said device being fixed with relation to the drum and the other end connected to the spindle, said members having bonded metallic faces and certain of said faces being converging, the adjacent metallic faces of said members being parallel and connected together.

11. In a wheel suspension device for a vehicle having a frame, a drum secured to the frame, a swinging wheel carrying arm having a spindle extending into said drum and journalled therein, a spring device comprising a plurality of annular rubber members housed within the drum, one end of said device being fixed with relation to the drum and the other end connected to the spindle, said members having bonded metallic faces, the adjacent metallic faces being parallel and substantially abutting, and means for releasably coupling said faces together.

12. In a wheel suspension device for a vehicle having a hollow substantially closed support, a swinging wheel carry arm journalled within said support, a spring device mounted within the support and connected at one end thereof to the arm and at the opposite end to the support, said device comprising a plurality of annular rubber members adapted to be subjected to torsional stresses and retained within said support under compression, said members having adjacent bonded metallic surfaces releasably connected together.

13. In a wheel suspension device for a vehicle having a frame, a support carried by the frame, a swinging wheel carrying arm having a spindle pivotally mounted on the support, a spring device comprising a plurality of annular rubber members carried by the support and connected together at their adjacent faces, one end of said device being fixed with relation to the support and the other end connected to the spindle, said rubber members having converging sides and the corresponding sides of adjacent members being non-parallel.

14. In a wheel suspension device for a vehicle having a frame, a support carried by the frame, a swinging wheel carrying arm having a spindle pivotally mounted on the support, a spring device comprising a plurality of annular rubber members carried by the support, one end of said device being fixed with relation to the support and the other end connected to the spindle, said members having bonded metallic faces and certain of said faces being converging, the adjacent metallic faces of said members being substantially parallel and connected together.

15. In a wheel suspension device for a vehicle having a frame, a support carried by the frame, a swinging wheel carrying arm having a spindle pivotally mounted on the support, a spring device comprising a plurality of annular rubber members carried by the support, one end of said device being fixed with relation to the support and the other end connected to the spindle, said members having bonded metallic faces, the adjacent metallic faces extending face to face in substantial parallelism, and means for releasably coupling said faces together.

CHERI M. SLOMAN.
HANS HIERTA.